United States Patent
Janicek

(10) Patent No.: US 8,111,472 B2
(45) Date of Patent: Feb. 7, 2012

(54) COLOR WHEEL

(75) Inventor: Emil Janicek, Westminster, CO (US)

(73) Assignee: Oerlikon Trading AG, Truebbach, Truebbach (CH)

( * ) Notice: Subject to any disclaimer, the term of this patent is extended or adjusted under 35 U.S.C. 154(b) by 180 days.

(21) Appl. No.: 12/516,427

(22) PCT Filed: Nov. 19, 2007

(86) PCT No.: PCT/EP2007/009967
§ 371 (c)(1),
(2), (4) Date: Sep. 17, 2009

(87) PCT Pub. No.: WO2008/067904
PCT Pub. Date: Jun. 12, 2008

(65) Prior Publication Data
US 2011/0063745 A1   Mar. 17, 2011

Related U.S. Application Data

(60) Provisional application No. 60/868,390, filed on Dec. 4, 2006.

(51) Int. Cl.
*G02B 5/22* (2006.01)
(52) U.S. Cl. ........................... 359/892; 359/889
(58) Field of Classification Search ............ 359/892, 359/889; 353/84
See application file for complete search history.

(56) References Cited

U.S. PATENT DOCUMENTS

| 6,598,977 | B1 | 7/2003 | Chen |
| 7,199,952 | B2* | 4/2007 | Niwa et al. ............. 359/892 |
| 7,443,621 | B2* | 10/2008 | Auell et al. ............ 359/891 |
| 2005/0099712 | A1 | 5/2005 | Kao et al. |
| 2007/0025001 | A1* | 2/2007 | Ueda et al. ............ 359/892 |

FOREIGN PATENT DOCUMENTS

WO   2007051608 A1   5/2007

OTHER PUBLICATIONS

International Search Report for PCT/EP2007/009967 dated Mar. 6, 2008.
Written Opinion for PCT/EP2007/009967 dated Mar. 6, 2008.
Anon, "Balancing Primer," Internet Citation, 2003, XP002418628.

* cited by examiner

*Primary Examiner* — Audrey Y Chang
(74) *Attorney, Agent, or Firm* — Pearne & Gordon LLP

(57) ABSTRACT

The present invention relates to a color wheel which allows for an easy to perform balancing. The color wheel comprises a motor and a color rotor with a carrier. Filter segments are mounted to the carrier. In addition the color rotor comprises a body with a surface perpendicular to the rotational axis of the rotor. The surface comprises a two dimensional matrix of holes which can be filled with balancing masses. In order to balance the color rotor it is rotated. During rotation, the unbalance is detected. In addition the location where to put balancing mass is detected. At this location balancing mass, such as for example adhesive is filled into the respective hole.

8 Claims, 2 Drawing Sheets

COLOR WHEEL

BACKGROUND OF THE INVENTION

1. Field of the Invention

The present invention relates to color wheels used for projectors to generate color sequential illumination. The present invention relates as well to projectors using such color wheels.

2. Description of Related Art

Devices of the aforementioned type are used in applications where periodic color changes need to be produced in rapid sequence. Examples of optical systems using such devices are picture generation devices or display arrangements. Rear or front projection systems for television systems are typical applications.

In order to produce the required rapid color changes, color filters are inserted into the optical light path of a light beam in rapid sequence. For this purpose a carrier is used that is equipped with circularly arranged filter segments on the periphery. This arrangement forms a color rotor with parts of the segments radially extending over the carrier and thereby forming a color ring to be inserted into the optical path. This color rotor is rotated around its central axis. Through the rotation of the color rotor the filter segments are alternatingly inserted into the optical path and removed from it. Thereby the desired rapid color change is produced. In order to realize this rotation the color rotor is fixed to a motor. Color rotor and motor form a color wheel.

Because the picture generation device must be able to produce a high picture quality, the color changes must be executed very rapidly. This means that the filter segments must be moved through the optical path of the light beam at very high speed. Fast rotation of the color rotor is therefore mandatory. As a result large forces due to accelerations which are several hundred times larger than the acceleration g due to gravity act on the color rotor and particularly on the sensitive filter segments; for particularly high picture qualities the accelerations can exceed 1000 g. Such picture generation devices must also satisfy very high brightness requirements which can only be achieved with powerful light sources. Through these powerful light sources the device is subjected to correspondingly high temperatures of up to 100° C.

In addition the radial concentricity of the device must be highly accurate in order to achieve a long operational life of the device. Therefore special care must be taken in balancing such color wheels.

However broad-scale utilization in so-called low-cost display applications is only feasible if it becomes possible to produce the color wheel at very low costs despite the high quality requirements. Therefore no complicated and expensive balancing methods may be applied.

There are different schemes of balancing methods known in the art. Static as well as dynamical balancing. Single and dual plane balancing.

In a classical static approach the rotor of the color wheel is rotated and the unbalance is measured. Unbalance is always present if the center of mass of the rotor does not coincide with the rotational axis. This can be corrected by either removing mass from the rotor at some point distant to the rotational axis (negative balancing) or by adding mass to the rotor at some point (positive balancing).

In order to perform negative balancing, typically holes are drilled into the carrier. If this is done while the color rotor remains connected to the motor there is a good chance that the bearings suffer from the forces they experience during the removal of the mass. One could as well think about removing the rotor form the motor before drilling the holes. Unfortunately this is quite time consuming and therefore renders the balancing method expensive. This is especially true if balancing needs to be performed in an iterative way (rotation-first correction-rotation-second correction . . . ).

In order to perform positive balancing additional balancing weight is attached to the rotor. For color wheels this is typically done by adhering a lump of adhesive to the carrier. If the weight of the adhesive is not enough, the adhesive is used to glue other material with a higher density, such as a piece of steel to the carrier. Performing the balancing procedure by such a step requires a high degree of accuracy and experience, since the adhesive tends to smear out, flowing to parts of the rotor where it should not go to. Therefore the carrier sometimes comprises a circular groove in order to receive the adhesive. This however limits the degree of freedom for positioning the balancing mass. In addition hardening of the adhesive takes in time before the rotor may be brought to rotation again. This makes the method quite expensive for example if balancing needs to be performed in an iterative way as described for the negative balancing.

According to a dynamical balancing method known in the art the carrier or another part of the rotor comprises a container with a ring shaped volume ready for receiving the balancing mass. Before rotating the rotor the adhesive and if necessary for example some metal beads are inserted into the container. The amount of adhesive is kept small enough in order not to fill completely the container. If such an assembly is rotated, the adhesive, together with the beads if present, will automatically flow to the correct axial position in order to minimize the unbalance. The adhesive needs then to be hardened. Care has to be taken, that the adhesive remains at the same position after rotating and before and/or during hardening the adhesive. Here as well this is one degree of freedom less for the position of the balancing mass since the radial position is predetermined by the container.

The balancing methods described until now exclusively refer to single plane balancing. This is often sufficient, especially if the rotor may be well approximated by a thin plate and if rotational speed is moderate. However for color rotors comprised in color wheels the rotational speed is often in the range of 7000 rpm to up to 15000 rpm. In this cases single plane balancing is sometimes no more sufficient and balancing has to be performed for at least two well separated planes perpendicular to the rotational axis.

Here as well the different schemes such as negative balancing, positive balancing or dynamical balancing may be applied, with all the advantages as well as disadvantages of the respective methods.

It is the objective of the present invention to provide for a color wheel which allows for a simplified balancing procedure. This method should at least partially overcome the disadvantages of the methods already known in the art.

SUMMARY OF THE INVENTION

The objective can be met by providing a color wheel comprising a body with a dot mask attached to the color rotor. Such a dot mask is in a surface of the body. To form the dotmask, the surface is structured, comprising a plurality of separated wells, ready for receiving balancing mass. The body is attached to the color rotor in such a way that the surface with the wells is in a plane perpendicular to the rotational axis.

With a color wheel comprising such a dot mask statical positive balancing can be performed in a very efficient way: The color rotor is rotated and the unbalance is measured as before. As soon as it is clear where and how much mass has to be added to the rotor, the corresponding well can be filled accordingly with material such as adhesive and, if necessary, in addition with other material. The dot mask may comprise wells with different sizes. This allows to perform rough balancing by filling or partially filling one or some of the wells of large size and then to perform fine balancing by filling or partially filling one or some of the well of small size.

DETAILED DESCRIPTION OF THE INVENTION

In the following the invention is explained in more detail with the help of the figures and the corresponding embodiments as examples.

Figure 1:
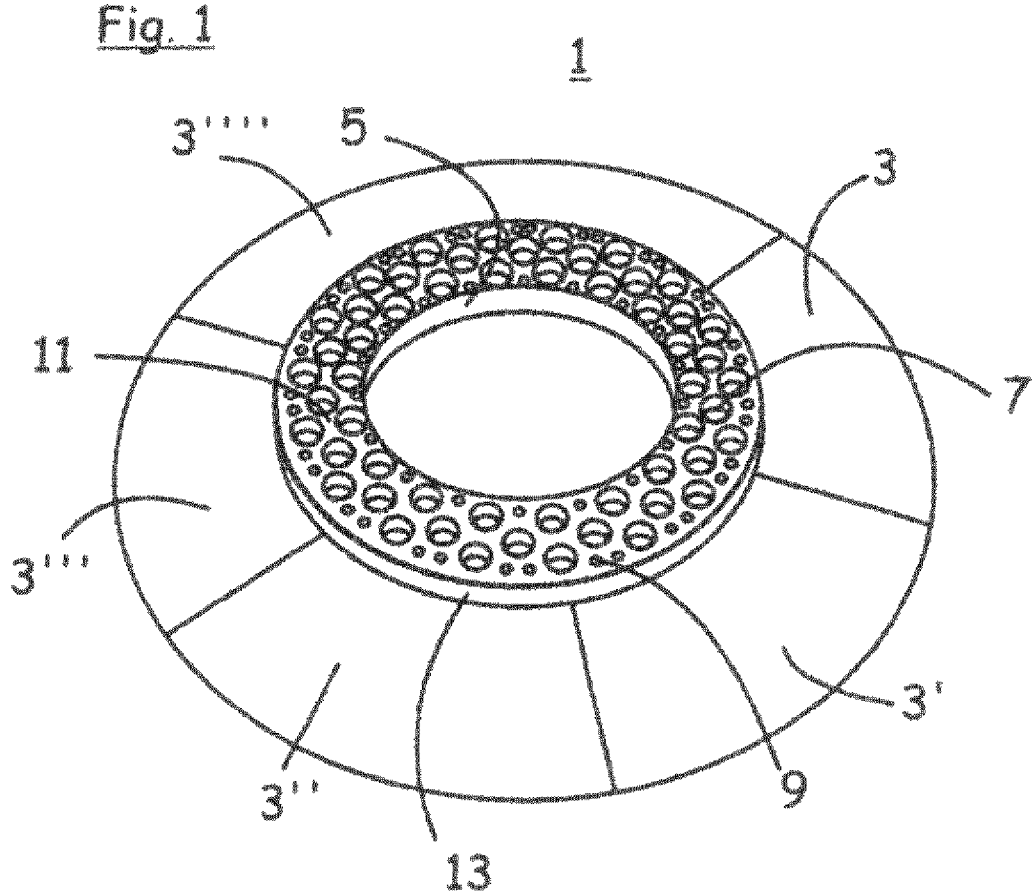
FIG. 1 Color wheel according to a first embodiment of the present invention

FIG. 1 shows a color wheel 1 according to a first embodiment of the present invention. The color wheel 1 comprises filter segments 3, 3', 3", 3"', 3"". In this example the filter segments are planar glass segments coated with thin film interference filters in order to characteristically reflect or transmit light in a wavelength dependent manner. These filter segments are attached to a carrier. In the figure the carrier is below the filter segments and therefore not shown. The filter segments are attached to the carrier in such a way that they extend over the carrier. The extending parts of the filter segments 3, 3', 3",3"', 3"" form together a ring shaped area which can inserted in to the optical path of the light beam in the projector. In this example the ring shaped area has an outer diameter of 70 mm and an inner diameter of 40 mm. Other sizes are possible and will be used.

At the surfaces of the filter segments 3, 3', 3",3"', 3"" pointing away from the carrier the color wheel 1 comprises a body 5 with a surface 11. This body is a disc with an outer diameter of 40 mm. In this embodiment the disc has a central hole with diameter of 26 mm. The thickness of the body 5 is 4 mm. There are two different sizes of wells 7, 9 realized in the body 5 thereby structuring the surface 11. The larger sized wells 7 have a diameter of 3 mm, the smaller sized wells 9 have a diameter of 1 mm. In this embodiment the all wells have a depth of 3 mm. As can be seen in FIG. 1 there are three different rings of multiple wells realized. This most outer ring is comprised of an alternating arrangement of one larger sized well 7 and two smaller sized well 9. The most inner ring is comprised of an alternating arrangement of one larger sized well 7 and one smaller sized will 9. The medium sized ring of well is comprised by larger sized wells 7 only.

The body 5 is formed of a plastic material, such as for example polycarbonate. Body 5 may be manufactured in a cost efficient way with the help of injection molding. The surface 11 as well as the outer cylinder barrel 13 of the body 5 is blackened in order to protect the plastic material from the light accidentally impinging on the body 5.

As an alternative, the wells might formed by holes in the body which go from one side of the body through to the other side. Bottom of the wells are the realized by for example the filter segments 3, 3', 3", 3"', 3"" themselves. For this alternative embodiment it is possible to give the wells a conical shape, the diameter of the wells at the bottom being increased as compared to the diameter of the wells at the surface. With this conical shape the adhesive used for balancing will predominantly remain within the wells due to the centrifugal forces.

As an alternative the body 5 may form the carrier for the filter segments 3, 3', 3", 3"'. With this approach it is mainly the body 5 which prevents the filter segments 3, 3', 3", 3"' from being detached due to centrifugal forces during rotation. The body 5, which is now as well carrier may be formed as a single piece from aluminum. Body 5 and the rotor axis connected to the motor may be formed of a single piece.

Shown in FIG. 1 are cylindrical wells. The well density is not as high as possible, however could be chosen as high as possible. Other cross sections of wells are possible. For example one could choose square or rectangular shaped wells. A honeycomb structure could be chosen as well.

Figure 2:
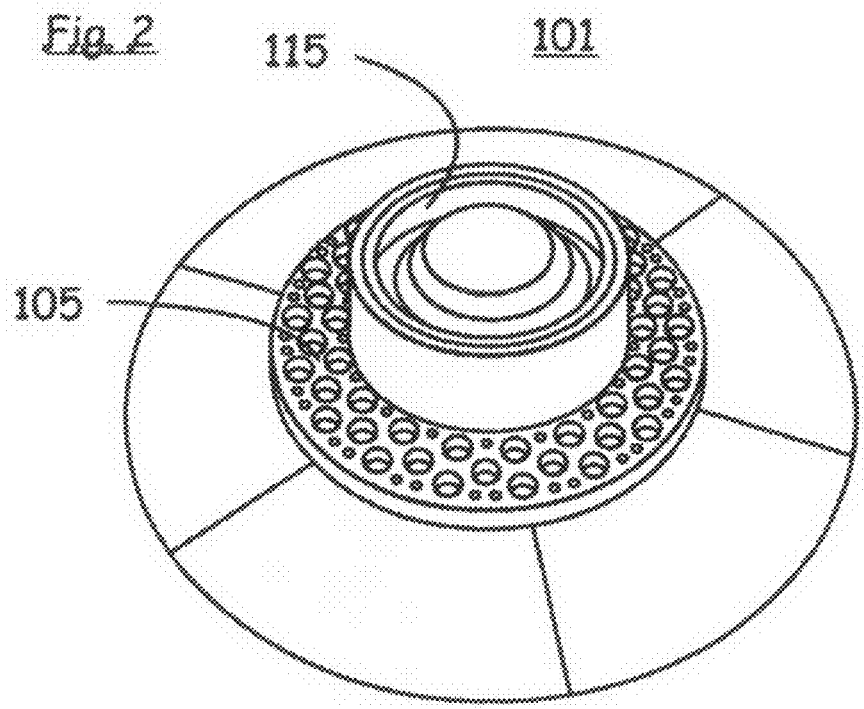
FIG. 2 Color wheel according to a second embodiment of the present invention comprising means for dual plane balancing FIG. 3 Color wheel according to a third embodiment of the present invention comprising means for dual plane balancing based on two dot masks.

The principle of the invention may be applied as well to dual plane balancing scheme. FIG. 2 shows a color wheel 101 where one plane may be statically balanced with the help of a dot mask 105 by filling selected wells of the dot mask with material. The other plane may be balanced by a dynamical balancing scheme. For this purpose a ring shaped inner volume of a container 115 is provided. Preferably after balancing the with the help of the dot mask has been finished, some fluid is introduced into the volume of the container 115 and the color wheel 101 is rotated. The fluid may be hardened even during rotation.

Figure 3:
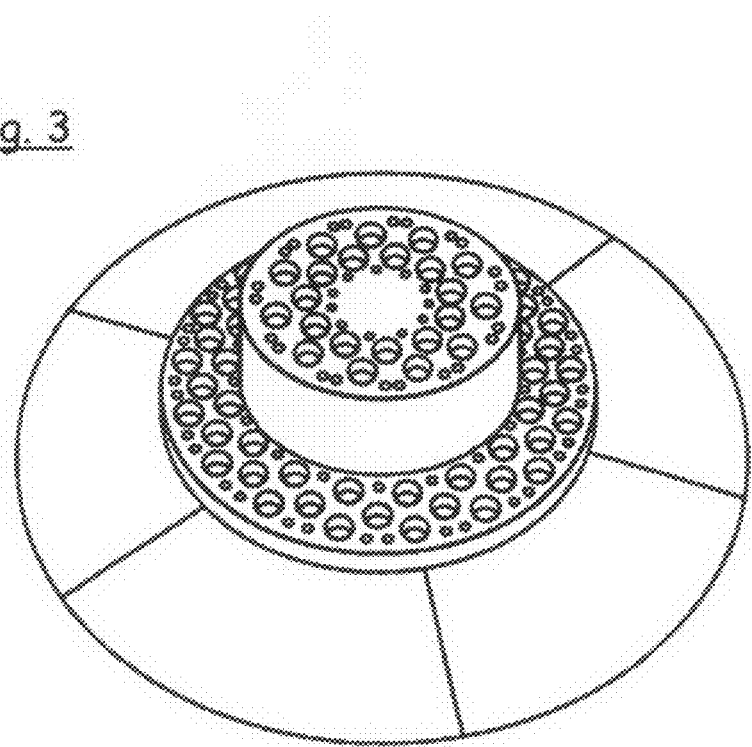

FIG. 3 shows an example suitable for dual balancing where the principle of the dot mask is applied to both balancing planes.

The invention claimed is:

1. A color wheel comprising a carrier and filter segments attached to said carrier and parts of the filter segments together providing a ring shaped area for being inserted into the optical light path of a light engine the color wheel comprising first means for balancing with, the first means for balancing comprising a body with a surface providing a two dimensional matrix of wells for receiving balancing material,
    characterized in that the two dimensional matrix of wells comprises wells with different sizes which allow to perform rough balancing by filling or partially filling one or some of the wells with large size and then to perform fine balancing by filling or partially filling one or some of the wells of small size.
2. A color wheel according to claim 1 where the body with the surface providing the plurality of wells is at least part of the carrier.
3. A color wheel according to claim 1 or 2 where the cross section of the wells substantially is of circular shape.
4. A color wheel according to claim 1 or 2 where the cross section of the wells substantially is of circular shape and two different cross sections are realized.
5. A color wheel according to claim 1 or 2 where the surface is a plane surface and the normal on the surface is parallel to the rotation axis.
6. A color wheel according to claim 1 or 2, further comprising second means for balancing.
7. A color wheel according to claim 1 or 2 wherein the surface is a plane surface and the normal on the surface is parallel to the rotation axis, the color wheel comprising second means for balancing in a plane distant from the first means for balancing.
8. A color wheel according to claim 1 or 2 wherein the surface is a plane surface and the normal on the surface is parallel to the rotation axis, the color wheel comprising second means for balancing in a plane distant from the first means for balancing, said second means for balancing comprising another body with a another surface providing another two dimensional matrix of wells for receiving balancing material.

* * * * *